Figure 1:
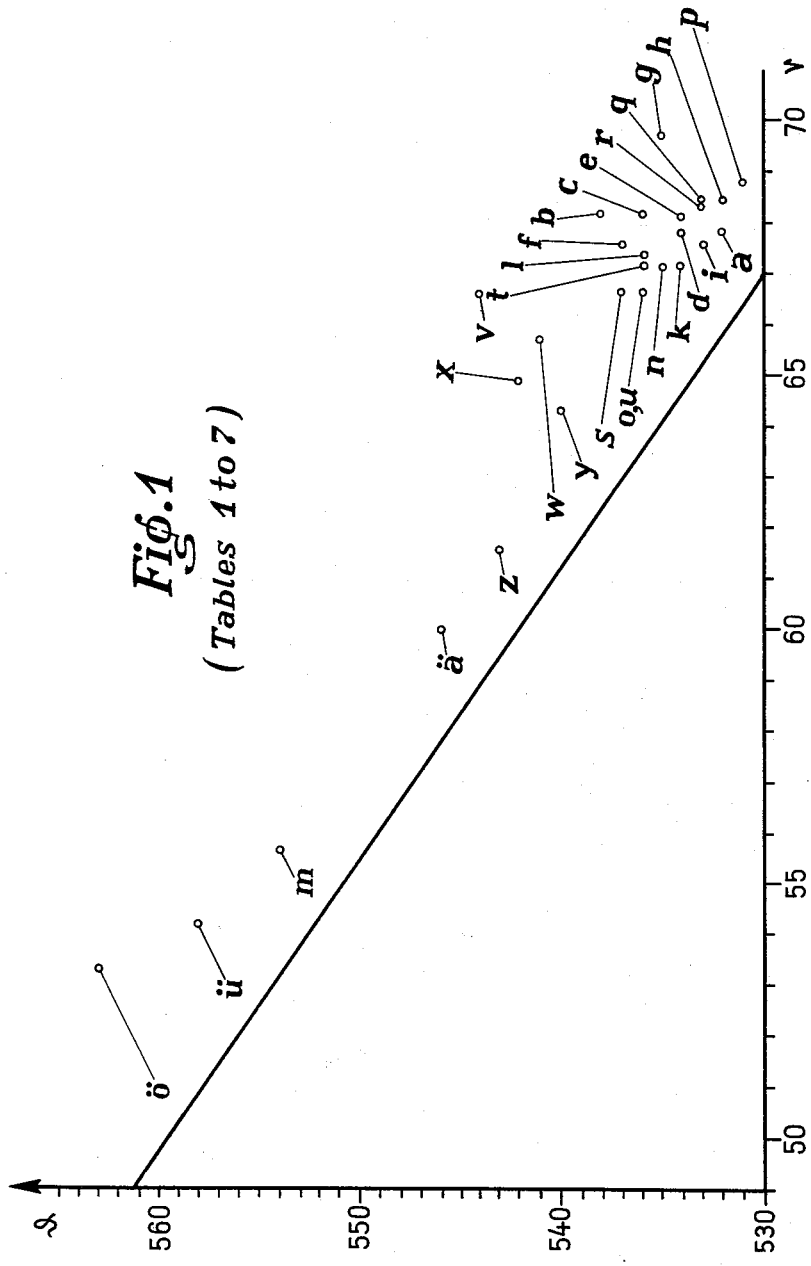

Aug. 15, 1961    G. WEISSENBERG ET AL    2,996,390
OPTICAL GLASS WITH ANOMALOUS PARTIAL DISPERSION
Filed Nov. 13, 1953    3 Sheets-Sheet 1

(Tables 1 to 7)

INVENTORS
Gustav Weissenberg
Norbert Meinert
BY
Benj. T. Rauber
their attorney

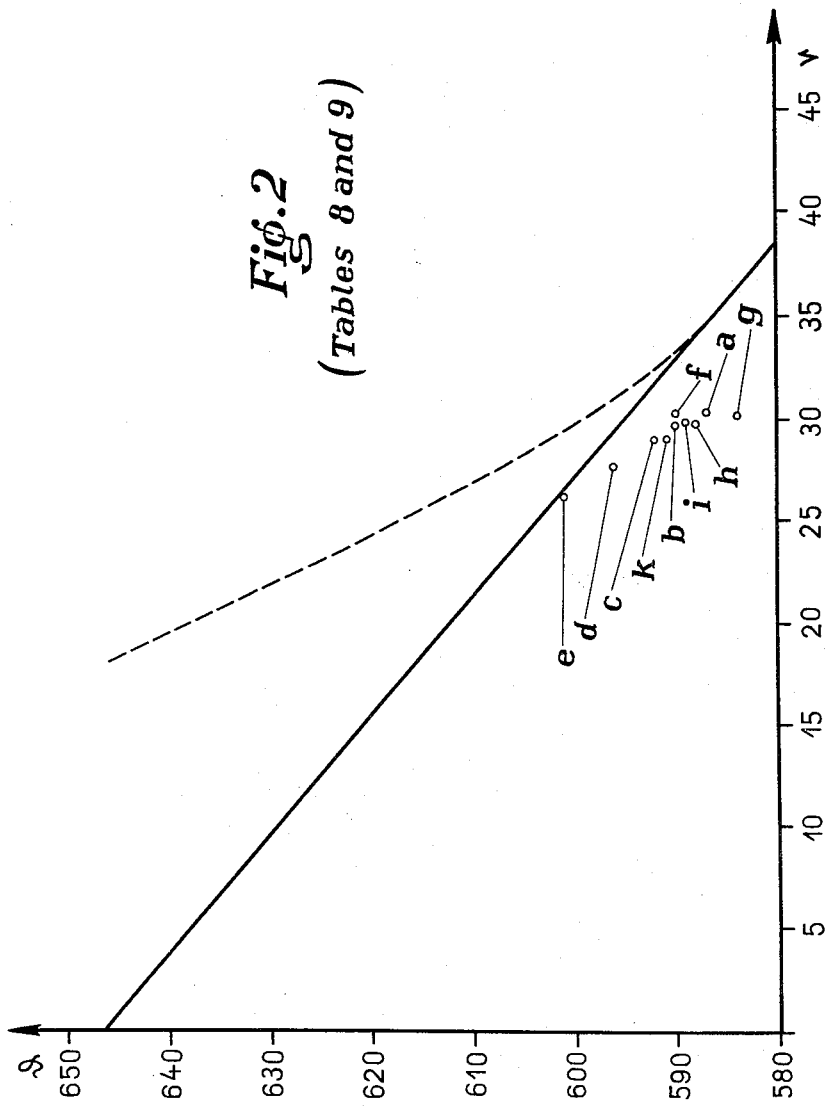

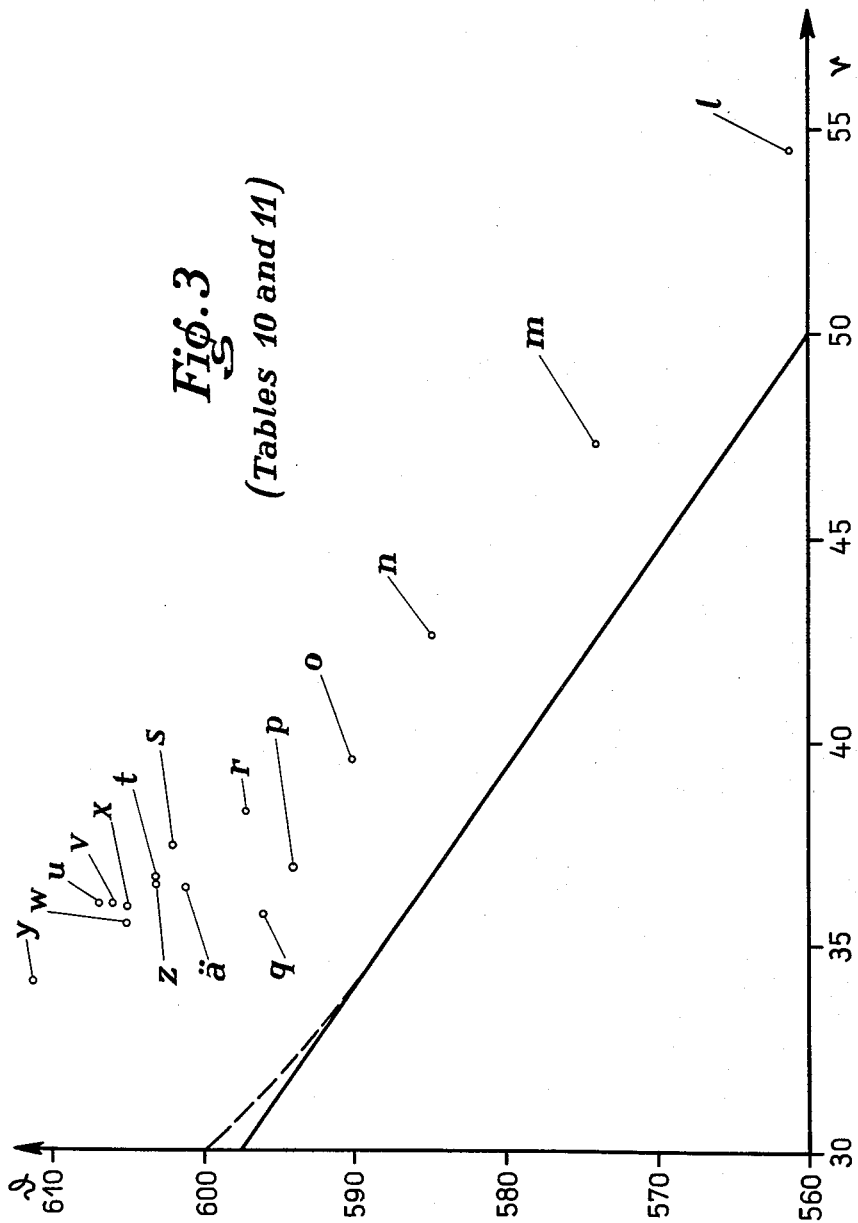
Fig.3 (Tables 10 and 11)

2,996,390
OPTICAL GLASS WITH ANOMALOUS PARTIAL DISPERSION

Gustav Weissenberg, Marburg (Lahn), and Norbert Meinert, Munchhausen, Kreis Marburg, Germany, assignors to Ernst Leitz, G.m.b.H., Wetzlar (Lahn), Germany, a corporation of Germany
Filed Nov. 13, 1953, Ser. No. 406,722
3 Claims. (Cl. 106—47)

Our invention relates to optical glasses with anomalous partial dispersions, to flint glass as well as to crown glass.

It has been known that when the Abbé value $$\nu = \frac{\nu_D - 1}{n_F - n_C}$$

of optical glasses hitherto known are plotted as abscissa and their partial dispersion values $$\vartheta = \frac{n_G - n_F}{n_F - n_C}$$

are plotted as ordinates, the resulting functions lie on a straight line. Actually the function of the highly refracting flint glasses with lower $\nu$ values deviates upwardly in an arc from the straight line.

In the correction of high value optical lens systems it is customary to use for the correction of chromatic aberrations of the first order a combination of flint and crown glasses, for these glasses differ most widely in the relation of their refractive index $n$, to their $\nu$ value. An improvement in the correction may be obtained by using flint and crown glasses of the same refractive index but with $\nu$ values differing as widely as possible, whereby chromatic aberrations of the second order could still not quite be taken care of. This is, however, possible if one is able to use glasses with partial dispersion values, $\vartheta$, as nearly equal as possible and with $\nu$ values as far apart as possible if at the same time the requirements relative to the refractive indexes are preserved or adhered to.

It is of the greatest advantage at the same time when the flint glass deviates to the negative side and the crown glass to the positive side of the $\nu-\vartheta$ line, that is, that the flint glass has a $\vartheta$ value corresponding to a smaller $\nu$ value and the crown glass a $\vartheta$ value corresponding to a large $\nu$ value. It can also be of advantage to combine flint glasses with high and with low indexes of refraction if at the same time the partial dispersions deviate respectively to the negative and to the positive sides of the straight line function of the optical glasses heretofore known in the $\nu-\vartheta$ diagram.

Our present invention relates to glasses of this type with anomalous partial dispersions. These glasses have the characteristic that they consist essentially of phosphates of the elements of the second group of the periodic system with the exception of radium, namely, phosphates of magnesium, calcium, strontium, barium.

The crown glasses of our invention with a positive deviation $\Delta \nu$ from the straight line relations of optical glasses consist of at least 50 percent by weight of a metaphosphate of the alkaline earth metals and at most of 50 percent by weight of compounds of the group of oxides, carbonates and sulphates of the group consisting of the alkali and alkaline earth metals. Further, lead oxide or lead phosphate may be added to these mixes. Moreover, boric acid may be used as an additive.

The flint glasses with a negative deviation $\Delta \nu$ consist of 80 to 90 percent by weight of lead orthophosphate whereby it is to be noted that the lead orthophosphate is to be brought into the glass melt as an already prepared compound to which is to be added up to 15 percent by weight of metaphosphates of the second group of the periodic system and oxides of tungsten and tantalum. Of special advantage is an addition up to 8 percent by weight of oxides or carbonates of the alkali metals. The flint glasses with a positive deviation $\Delta \nu$ and extremely low index of refraction consist of a glass forming substance preferably of a phosphate of the alkali metals, the alkaline earth metals or both and titanium dioxide.

A number of glasses of the invention are illustrated by way of example in the following tables in which the deviation, $\Delta \nu$, of the glasses from the $\nu-\vartheta$ straight line inclination are given in $\nu$ values and the displacement towards the right from the straight line for the crown glasses and the displacement towards the left or towards the right for the flint glasses are indicated for each glass with the plus or minus sign. The examples given are by way of illustration and not of limitation.

The deviations of the glasses of the several tables from the straight line functions of the optical glasses heretofore known are shown graphically in the accompanying drawings in which the several examples are identified by a reference letter given in the respective tables and in which:

FIG. 1 is a graph illustrating the deviation of the several glasses of tables 1 to 7, inclusive, FIG. 2 is a graph illustrating the deviations of the several glasses of tables 8 and 9, and, FIG. 3 is a graph illustrating the deviations for the several glasses of tables 10 and 11.

In FIG. 2 the function of the optical glasses heretofore known bends upwardly beginning at a $\nu$ value of 35 as indicated by the broken line.

Table 1

(In percent by weight)

| Melt No. | Identity letter | $Mg(PO_3)_2$ | $Li_2CO_3$ | $B_2O_3$ | $n_D$ | $\nu$ | $\vartheta$ | $\Delta \nu$ |
|---|---|---|---|---|---|---|---|---|
| R 377 | a | 97.4 | 2.6 | | 1.5079 | 67.8 | 0.532 | +1.9 |
| R 246 | b | 95.3 | 4.7 | | 1.5153 | 68.0 | 0.538 | +5.7 |
| R 247 | c | 91.0 | 9.0 | | 1.5188 | 68.1 | 0.536 | +4.5 |
| R 248 | d | 83.4 | 16.6 | | 1.5330 | 67.6 | 0.534 | +3.1 |
| R 249 | e | 77.0 | 23.0 | | 1.5405 | 67.0 | 0.534 | +3.4 |
| R 250 | f | 71.5 | 28.5 | | 1.5450 | 67.2 | 0.537 | +4.5 |
| W 451/R 268 | g | 76.0 | 12.6 | 11.4 | 1.5429 | 69.8 | 0.535 | +5.5 |
| R 236 | h | 64.5 | 25.8 | 9.7 | 1.5559 | 68.5 | 0.532 | +2.5 |
| R 237 | i | 60.6 | 30.3 | 9.1 | 1.5559 | 68.1 | 0.533 | +2.2 |
| R 238 | k | 57.2 | 34.4 | 8.4 | 1.5565 | 67.2 | 0.534 | +2.4 |

Table 2

(Showing a melt of magnesium metaphosphate and sodium sulphate in percent by weight)

| Melt No. | Identity letter | Mg(PO$_3$)$_2$ | Na$_2$SO$_4$ | $n_D$ | $\nu$ | $\vartheta$ | $\Delta\nu$ |
|---|---|---|---|---|---|---|---|
| R 301 | l | 75 | 25 | 1.5135 | 67.3 | 0.536 | +3.7 |

Table 3

(In percent by weight)

[Showing a magnesium metaphosphate and calcium oxide system, namely magnesium metaphosphate, calcium oxide and boric oxide and also a final melt of magnesium metaphosphate and calcium fluoride]

| Melt No. | Identity letter | Mg(PO$_3$)$_2$ | CaO | B$_2$O$_3$ | CaF$_2$ | $n_D$ | $\nu$ | $\vartheta$ | $\Delta\nu$ |
|---|---|---|---|---|---|---|---|---|---|
| R 305 | m | 91.0 | 9 | | | 1.5212 | 67.3 | 0.554 | +2.4 |
| R 306 | n | 85.8 | 14.2 | | | 1.5376 | 67.1 | 0.535 | +2.9 |
| R 307 | o | 81.8 | 18.2 | | | 1.5517 | 66.7 | 0.536 | +3.0 |
| R 308 | p | 80 | 8 | 12 | | 1.5378 | 68.7 | 0.531 | +2.3 |
| R 309 | q | 76 | 12.6 | 11.4 | | 1.5494 | 68.4 | 0.533 | +3.1 |
| R 310 | r | 72 | 16.9 | 11.1 | | 1.5595 | 68.3 | 0.533 | +3.0 |
| R 302 | s | 83.4 | | | 16.6 | 1.5456 | 67.0 | 0.537 | +3.6 |

Table 4

(In percent by weight)

[Using a carbonate of an alkaline earth metal instead of the oxide]

| Melt No. | Identity letter | Mg(PO$_3$)$_2$ | BaCO$_3$ | $n_D$ | $\nu$ | $\vartheta$ | $\Delta\nu$ |
|---|---|---|---|---|---|---|---|
| R 314 | t | 88.2 | 11.8 | 1.5170 | 67.3 | 0.536 | +3.5 |
| R 315 | u | 79.0 | 21.0 | 1.5330 | 66.9 | 0.536 | +3.0 |
| W 489/R 316 | v | 71.4 | 28.6 | 1.5457 | 66.6 | 0.544 | +7.6 |
| R 320 | w | 62.5 | 37.5 | 1.5659 | 65.6 | 0.541 | +5.0 |
| W 481/R 321 | x | 55.6 | 44.4 | 1.5824 | 64.8 | 0.542 | +4.8 |

Table 5

(In percent by weight)

[In which magnesium metaphosphate is combined with lead oxide]

| Melt No. | Identity letter | Mg(PO$_3$)$_2$ | PbO | $n_D$ | $\nu$ | $\vartheta$ | $\Delta\nu$ |
|---|---|---|---|---|---|---|---|
| R 295 | y | 95.4 | 4.6 | 1.5118 | 64.2 | 0.540 | +3.0 |
| R 296 | z | 90.8 | 9.2 | 1.5226 | 61.5 | 0.543 | +2.0 |

Table 6

(In percent by weight)

[Showing a melt of magnesium metaphosphate with lead orthophosphate]

| Melt No. | Identity letter | Mg(PO$_3$)$_2$ | Pb$_3$(PO$_4$)$_2$ | $n_D$ | $\nu$ | $\vartheta$ | $\Delta\nu$ |
|---|---|---|---|---|---|---|---|
| R 271 | ā | 83.4 | 16.6 | 1.5321 | 59.9 | 0.546 | +2.1 |

Table 7

(In percent by weight)

[Showing a system of magnesium metaphosphate, lead orthophosphate and acid strontium phosphate]

| Melt No. | Identity letter | Mg(PO$_3$)$_2$ | Pb$_3$(PO$_4$)$_2$ | SrHPO$_4$ | P$_2$O$_5$ | $n_D$ | $\nu$ | $\vartheta$ | $\Delta\nu$ |
|---|---|---|---|---|---|---|---|---|---|
| R 285 | b̄ | 58.8 | 29.4 | 11.8 | | 1.5772 | 53.2 | 0.563 | +5.2 |
| W 465/R 273 | c̄ | 50 | 25 | 20 | 5 | 1.5748 | 54.2 | 0.558 | +3.2 |

Table 8
(In percent by weight)

[In this table there is shown first a glass of magnesium metaphosphate and lead orthophosphate, then glasses of magnesium metaphosphate, lead orthophosphate and tungstic oxide, and finally of lead orthophosphate, tungstic oxide and phosphorus pentoxide namely magnesium metaphosphate, lead orthophosphate, tungstic oxide and lithium carbonate]

| Melt No. | R 280 | R 341 | R 343 | R 351 | R 350 | R 432 |
|---|---|---|---|---|---|---|
| Identity letter | a | b | c | d | e | f |
| $Mg(PO_3)_2$ | 11 | 10.8 | 10.4 | | | 10.4 |
| $P_2O_5$ | | | | 6.7 | 3.4 | |
| $Pb_3(PO_4)_2$ | 89 | 87.0 | 83.3 | 83.3 | 86.2 | 83.7 |
| $WO_3$ | | 2.2 | 6.3 | 10.0 | 10.4 | 4.2 |
| $Li_2CO_3$ | | | | | | 1.7 |
| $n_D$ | 1.8197 | 1.8226 | 1.8323 | 1.8560 | 1.8900 | 1.8120 |
| $\nu$ | 30.2 | 29.7 | 29.0 | 27.6 | 26.2 | 30.3 |
| $\vartheta$ | 0.578 | 0.590 | 0.592 | 0.596 | 0.601 | 0.590 |
| $\Delta\nu$ | −4.2 | −3.0 | −2.5 | −1.6 | 0 | −2.4 |

Table 9
(In percent by weight)

[In this table are shown combinations of magnesium metaphosphate, lead orthophosphate and tantalic oxide]

| Melt No. | Identifying letter | $Mg(PO_3)_2$ | $Pb_3(PO_4)_2$ | $Ta_2O_5$ | $n_D$ | $\nu$ | $\vartheta$ | $\Delta\nu$ |
|---|---|---|---|---|---|---|---|---|
| R 429 | g | 10.8 | 87.0 | 2.2 | 1.8183 | 30.1 | 584 | −6.0 |
| R 430 | h | 10.6 | 85.1 | 4.3 | 1.8324 | 29.7 | 588 | −4.2 |
| R 433 | i | 10.3 | 83.3 | 6.4 | 1.8167 | 29.8 | 589 | −3.5 |
| R 434 | k | 10.2 | 81.6 | 8.2 | 1.8287 | 29.1 | 591 | −3.0 |

Table 10
(In percent by weight)

[In this table are shown glasses in which sodium carbonate and titanium dioxide are used in addition to the glass forming substance, magnesium metaphosphate, the melt being held at the melting temperature until the sodium carbonate has been completely decomposed and the carbon dioxide driven off]

| Melt No. | $Mg(PO_3)_2$ | $Na_2CO_3$ | $TiO_2$ | $n_D$ | $\nu$ | $\vartheta$ | $\Delta\nu$ | Identifying letter |
|---|---|---|---|---|---|---|---|---|
| R 439 | 54.0 | 43.3 | 2.7 | 1.5237 | 54.5 | 561 | +5.5 | l |
| R 440 | 52.6 | 42.1 | 5.3 | 1.5431 | 47.3 | 574 | +6.0 | m |
| R 441 | 51.3 | 41.0 | 7.7 | 1.5620 | 42.6 | 585 | +7.5 | n |
| W 563/W 324 | 50 | 40 | 10 | 1.5782 | 39.6 | 590 | +6.7 | o |
| R 442 | 48.7 | 39.1 | 12.2 | 1.5943 | 37.0 | 594 | +5.5 | p |
| R 443 | 47.6 | 38.1 | 14.3 | 1.6065 | 35.8 | 596 | +5.0 | q |

Table 11
(In percent by weight)

[In this table are shown further melts which have been formed from sodium pyrophosphate. The cryolite ($Na_3AlF_6$) used in these melts serves only as a flux]

| Melt No. | $NaPO_3$ | $Na_4P_2O_7$ | $Na_3AlF_6$ | $TiO_2$ | $n_D$ | $\nu$ | $\vartheta$ | $\Delta\nu$ | Identifying letter |
|---|---|---|---|---|---|---|---|---|---|
| R 458 | 45.5 | 40.9 | 4.5 | 9.1 | 1.5472 | 38.3 | 597 | +7.7 | r |
| R 463 | 40.8 | 44.9 | 4.1 | 10.2 | 1.5534 | 37.5 | 602 | +8.6 | s |
| R 462 | 42.6 | 42.6 | 4.2 | 10.6 | 1.5570 | 36.7 | 603 | +8.1 | t |
| W 568/R 461 | 44.4 | 40.0 | 4.5 | 11.1 | 1.5597 | 36.1 | 607 | +8.8 | u |
| R 465 | 38.5 | 46.1 | 3.8 | 11.6 | 1.5620 | 36.1 | 606 | +8.5 | v |
| R 464 | 41.7 | 41.7 | 4.1 | 12.5 | 1.5687 | 35.6 | 605 | | w |
| R 467 | 35.1 | 49.1 | 3.5 | 12.3 | 1.5639 | 36.0 | 605 | +6.1 | x |
| R 466 | 37.8 | 45.2 | 3.8 | 13.2 | 1.5718 | 34.7 | | | |
| R 459/W 569 | 43.5 | 39.2 | 4.3 | 13.0 | 1.5725 | 34.2 | 611 | +8.1 | y |
| R 468/W 570 | 34.4 | 48.3 | 3.5 | 13.8 | 1.5612 | 36.6 | 603 | +8.0 | z |
| R 469/W 571 | 30.3 | 54.6 | 3.0 | 12.1 | 1.5612 | 36.5 | 601 | +7.3 | ā |

Having described our invention what we claim is:

1. Substantially fluorine free flint glass with low index of refraction and high dispersion consisting essentially of a melt of a mixture of a metaphosphate of an alkaline earth metal, an alkali carbonate and titanium oxide said titanium oxide comprising from 2.7% to 14.3% by weight of the melt and the metaphosphate comprising from 47.6% to 54% by weight of the melt.

2. The flint glass of claim 1 in which the metaphosphate is magnesium metaphosphate.

3. The flint glass of claim 2 in which the alkali carbonate is sodium carbonate.

References Cited in the file of this patent

UNITED STATES PATENTS 2,684,304     Weissenberg et al. _____ July 20, 1954

OTHER REFERENCES

The Glass Industry, Feb. 1935, p. 51, Article by Blau and Silverman.